Feb. 12, 1929.  O. JUNKER  1,701,889

METHOD FOR MANUFACTURING METAL SHEETS AND STRIPS

Filed Nov. 23, 1927    2 Sheets-Sheet 1

Otto Junker, Inventor

Otto Junker, Inventor

Patented Feb. 12, 1929.

1,701,889

UNITED STATES PATENT OFFICE.

OTTO JUNKER, OF STOLBERG, GERMANY.

METHOD FOR MANUFACTURING METAL SHEETS AND STRIPS.

Application filed November 23, 1927, Serial No. 235,287, and in Germany November 25, 1926.

Sheets and long strips of metal are now usually manufactured by rolling of cast ingots. This method requires expensive manufacturing plants and results in products which are impaired by impurities at the surface of the ingots and of the rolls.

This invention relates to a new method of manufacturing sheets and long strips of metal which is free from the above mentioned drawbacks. The new method consists therein that the sheets or strips are peeled off from the cast ingots by cutting tools under temperature conditions under which the metal to be treated assumes a somewhat plastic or mouldable state; suitable temperatures being ordinarily those at which the metals are malleable. The new method has proved to be particularly useful in the manufacture of sheets and strips of copper containing metals, preferably alloys mainly consisting of copper and zinc such as brass. If it is a question of manufacturing sheets or strips of brass containing about 63% of copper and 37% of zinc a suitable working temperature is 780 to 800° C., the temperature should in this case not exceed say 820 to 850° C. Of course care must be taken to maintain the edge of the cutting tool sharp during operation under the prevailing temperature conditions.

The figures of the accompanying drawing show how the new method may be carried into practice.

Figure 1:
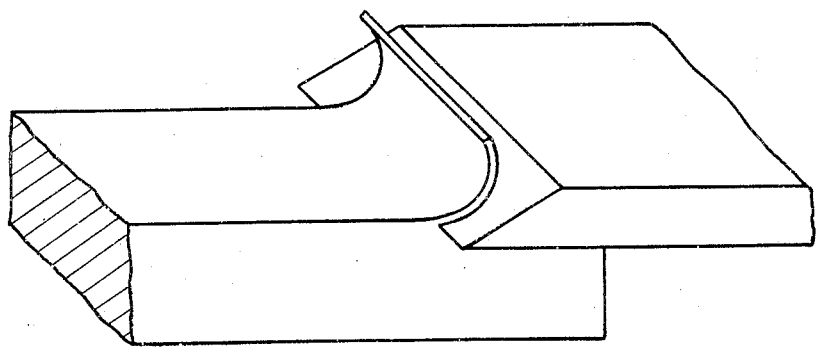
Figures 1 and 2 show diagrammatically in perspective views the former how sheets or plates can be cut by a tool having substantially the form of a plane-iron from a rectangular block and the latter how by spirally peeling off a rotating round disc a long metal strip can be produced. These figures are self-explanatory.
Figure 2:
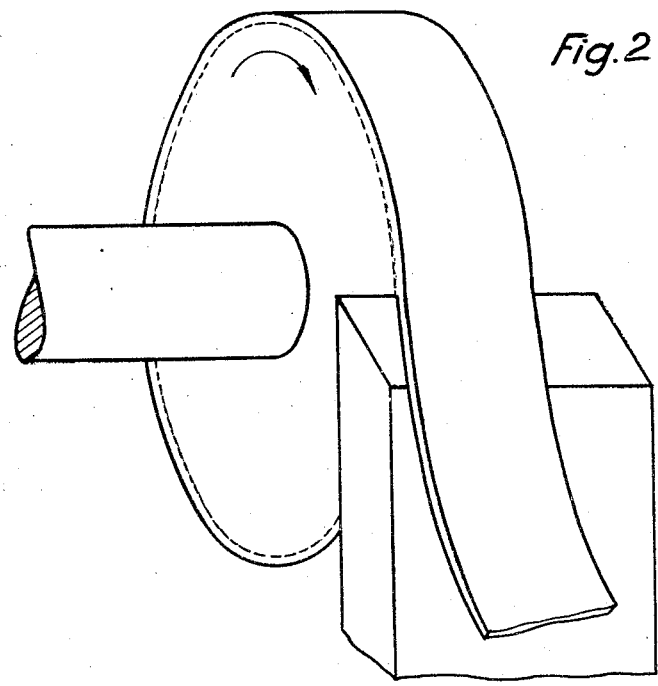
Figure 3:
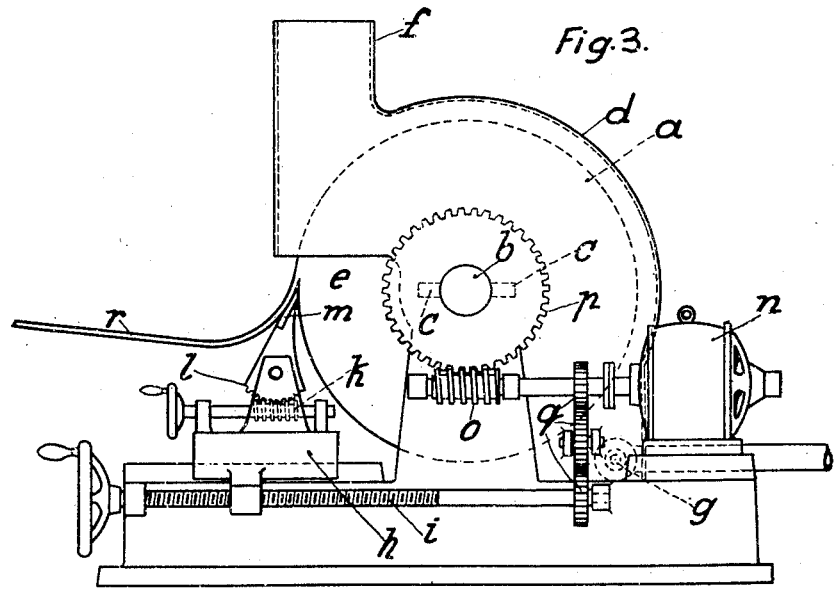
Figures 3 and 4 illustrate in elevation and plan respectively a constructional form of a device for manufacturing long metal strips according to the invention.
Figure 4:
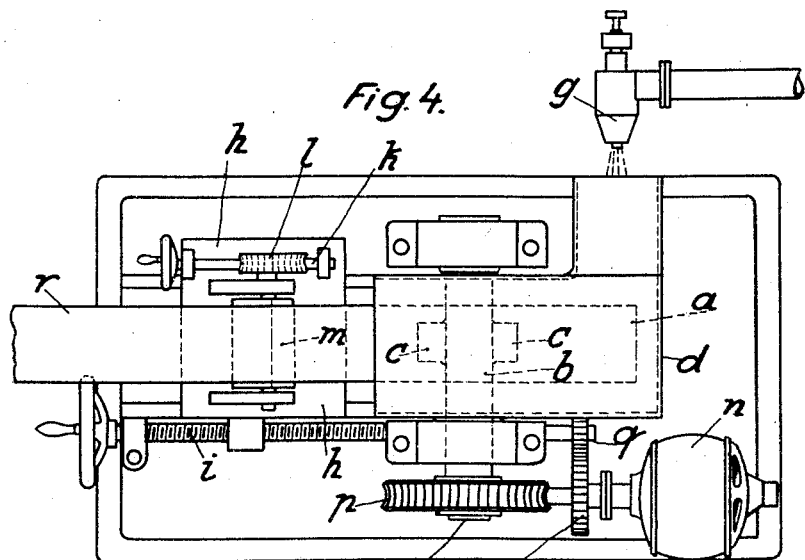

$a$ designates the round disc forming the stock of metal for manufacturing the strip; $b$ is a shaft provided with pins $c$ coacting with the disc so as to rotate it when the shaft is set in motion. $d$ is a casing enclosing disc $a$ with exception of a segment $e$ thereof. The casing $d$ leaves a free space around the disc and is provided with a chimney $f$ allowing the escape of the combustion gases of an oil burner $g$ the flame of which is blown into the free space between the casing $d$ and disc $a$. $h$ is a slide adapted to be moved to and fro by a screw $i$ within the space left free by the casing $d$. The slide has mounted thereon a worm gear comprising a worm $k$ and a worm-wheel segment $l$ carrying a cutting tool $m$. By actuating screw $i$ and worm $k$ the inclination of the tool with relation to the tangential plane of the disc may be altered at will.

For driving shaft $b$ a motor $n$ is provided carrying on its shaft a worm $o$ coacting with a worm wheel $p$ firmly mounted on shaft $b$. A gear connection $q$ between the shaft of the motor $n$ and the screw $i$ effects that on rotating the disc $a$ by motor $n$ the cutting tool $m$ is automatically advanced towards the disc resulting in spirally peeling off of the surface of the disc forming a metal strip $r$.

What I claim is:—

1. A method of manufacturing metal sheets and strips comprising peeling off of a surface layer of a metal block or ingot by a cutting tool under temperature conditions of the block or ingot securing a mouldable condition thereof.

2. The method of claim 1 applied to the manufacture of sheets and strips of copper containing metal.

In testimony whereof, I affix my signature.

OTTO JUNKER.